Patented Mar. 14, 1961

2,975,197

HALOGENATED PREGNADIENES

George R. Allen, Jr., Paramus, and Martin J. Weiss, Oradell, N.J., assignors to American Cyanamid Company, New York, N.Y., a corporation of Maine No Drawing. Filed July 9, 1958, Ser. No. 747,330

6 Claims. (Cl. 260—397.45)

This invention relates to new steroid compounds. More particularly, it relates to 11α-hydroxy-4,16-pregnadienes and methods of preparing the same.

The use of cortisone and hydrocortisone in the treatment of collagen diseases such as arthritis, bursitis and the like is well known. While these hormones are active and produce the desired remission in symptoms, they are limited in use because of undesirable side reactions such as edema, buffalo hump, weight increase and the like. A new development in this field having substantially none of the side effects of cortisone or hydrocortisone is the new hormone Aristocort (9α-fluoro-16α-hydroxy prednisolone). The latter product has high glucocorticoid and mineralocorticoid activity with very little side effects. It is, therefore, desirable that commercially feasible methods be available for the production of this hormone.

We have now found that the compounds having the following general formula are easily convertible into 9α-fluoro-16α-hydroxy prednisolone:

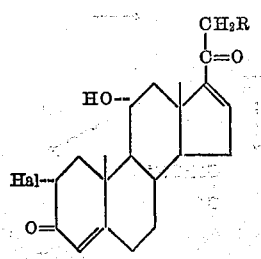

in which R is halogen or lower alkanoyloxy radicals and Hal is halogen such as bromine or iodine.

The compounds of the present invention do not in general form crystalline solids. At room temperature, they appear as a gum or in an amorphous state.

The compounds of the present invention are prepared from known compounds such as 11α-hydroxy-4,16-pregnadiene-3,20-dione hereinafter described in the examples. The compounds of the present invention are shown in the following flowsheet.

FLOWSHEET

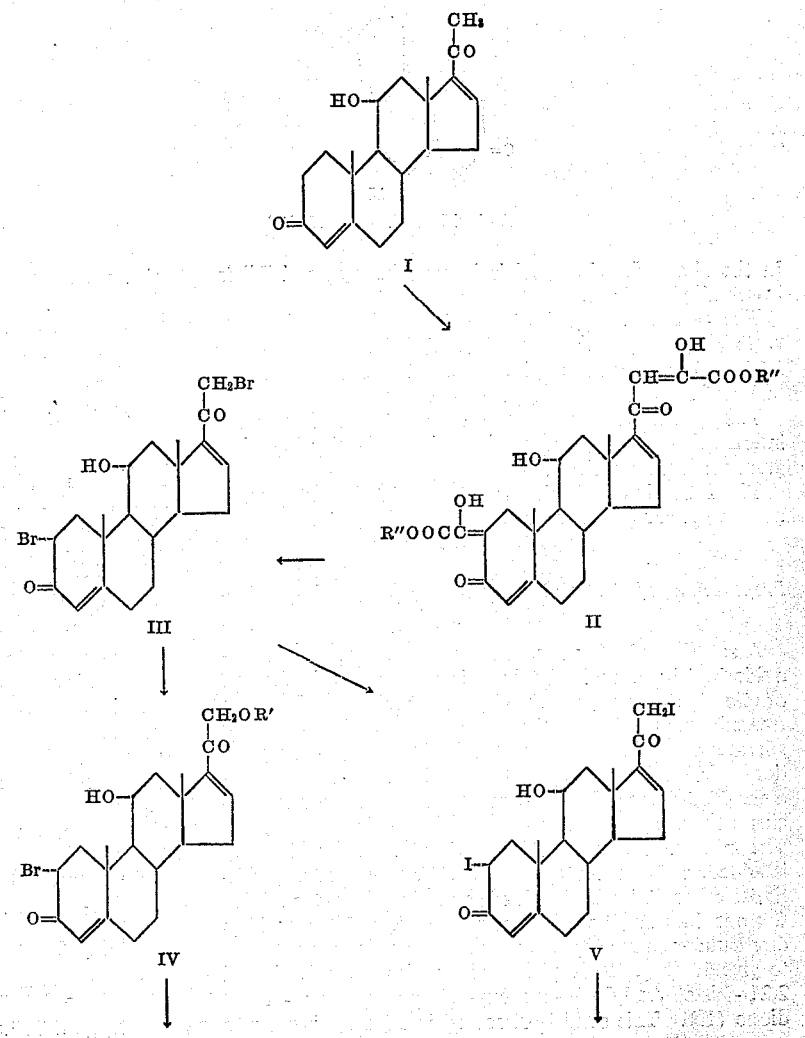

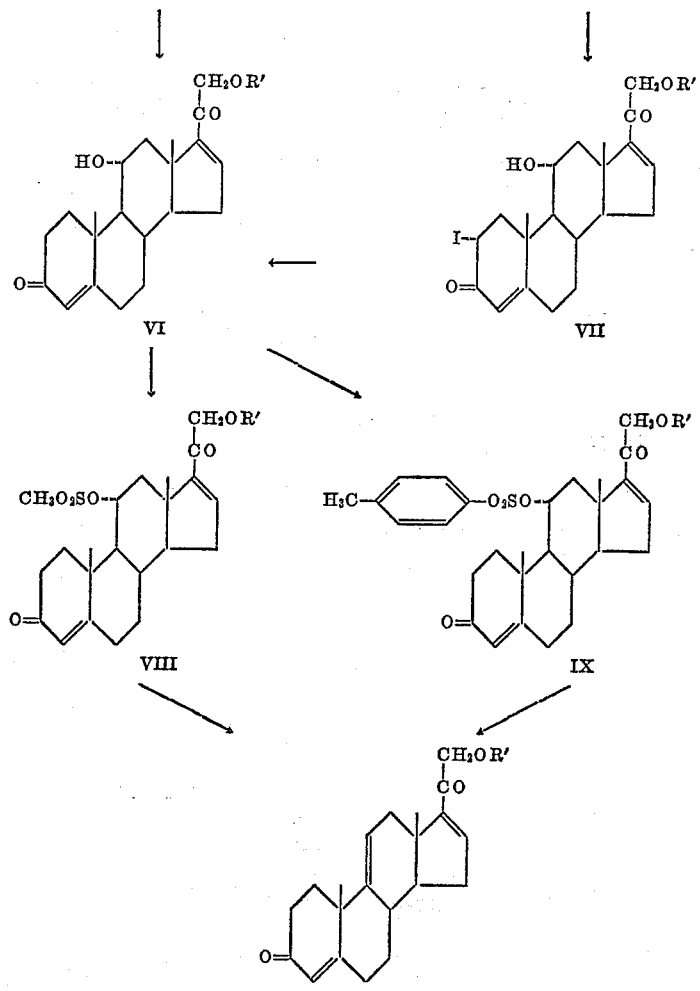

(United States Patent 2,773,058)

In the above flowsheet, R' is lower alkanoyl, and R" is lower alkyl radicals.

The compounds of the present invention can be converted into the starting materials of United States Patent 2,773,058, as shown in the flowsheet above and as described in detail hereinafter in the examples.

The products of the present invention are highly useful intermediates in the preparation of steroids having high glucocorticoidal activity.

The following examples describe in detail the preparation of the compounds of the present invention.

EXAMPLE 1

*Preparation of 2α,21-dibromo-11α-hydroxy-4,16-pregnadiene-3,20-dione (III)*

A solution of 4.2 ml. of 1 N methanolic sodium methoxide in 16 ml. of dry benzene is distilled until 16.5 ml. of distillate is collected. The cool residual mixture is treated with 0.92 ml. of ethyl oxalate during magnetic stirring; all solid dissolves. There is added to the solution 0.652 g. (2.0 mmole) of 11α-hydroxy-4,16-pregnadiene-3,20-dione (I). The resulting yellow solution begins depositing an amorphous solid within one minute. The mixture is stirred during 23 hours. Ether (10 ml.) is added, and the mixture is stirred for one hour. Additional ether (25 ml.) is added, and the mixture is stirred for one hour. The mixture is filtered, and the solid is dried under reduced pressure over phosphorus pentoxide to give 1.145 g. (99% yield) of the disodio derivative of 2,21 - bis-ethoxalyl-11α-hydroxy-4,16-pregnadiene - 3,20-dione (II). This solid is dissolved in 50 ml. of water to give a clear orange solution. An aliquot of this solution gives a deep wine color when treated with an alcoholic ferric chloride solution. The aqueous solution is acidified with a 5% hydrochloric acid solution. The precipitated solid is collected by filtration and dried to give 0.816 g. (77% yield) of 2,21-bis-ethoxalyl-11α-hydroxy-4,16-pregnadiene-3,20-dione (II) as an amorphous solid:

$\lambda_{max.}^{MeOH}$ 242 m$\mu$ ($\epsilon$ 15,300), 310 m$\mu$ ($\epsilon$ 13,100) and $\lambda_{max.}^{0.1\ N\ NaOH}$ 250 m$\mu$ ($\epsilon$ 18,700), 335 m$\mu$ ($\epsilon$ 19,800); $\lambda_{max.}^{KBr}$ 2.88$\mu$, 5.75$\mu$, 6.02$\mu$, 6.15$\mu$, 6.97$\mu$, 7.92$\mu$ A solution of 0.528 g. of 2,21-bis-ethoxalyl-11α-hydroxy-4,16-pregnadiene-3,20-dione (II) prepared above and 0.392 g. of potassium acetate in 10 ml. of methanol is chilled in an ice bath during magnetic stirring. This solution is treated with 4.95 ml. of 0.40 M bromine in carbon tetrachloride solution over twenty minutes. The solution is stirred for ten minutes after the bromine addition is completed and then treated with 2.0 ml. of 1 N methanolic sodium methoxide. The resulting solution is concentrated on the steam bath to remove the carbon tetrachloride, and the concentrate is diluted with 15 ml. of water and extracted with 50 ml. of methylene chloride. The extract is dried over magnesium sulfate and taken to dryness to furnish the dibromo compound as an amber gum.

Ultraviolet spectrum:

$\lambda_{max.}^{MeOH}$ 243 m$\mu$ ($\epsilon$ 22,700)

Infrared spectrum:

$\lambda_{max.}^{KBr}$ 2.95, 5.80, 6.18, 6.30$\mu$

EXAMPLE 2

*Preparation of 21-acetoxy-2α-bromo-11α-hydroxy-4,16-pregnadiene-3,20-dione (IV)*

A mixture of 2.20 g. of potassium bicarbonate and 1.3 ml. of glacial acetic acid is well ground with a mortar and pestle. The resulting powder is added to a solution of 0.500 g. of 2α,21-dibromo-11α-hydroxy-4,16-pregnadiene-3,20-dione in 65 ml. of acetone. The resulting mixture is stirred at room temperature for three days. The mixture is diluted to a volume of 400 ml. with water and extracted with methylene chloride (2 x 100 ml.). The combined extracts are taken to dryness after drying over magnesium sulfate to give 0.398 g. of gum.

Ultraviolet spectrum:

$\lambda_{max.}^{MeOH}$ 243 m$\mu$ ($\epsilon$ 23,500)

Infrared spectrum:

$\lambda_{max.}^{KBr}$ 2.95, 5.75, 5.85, 5.90, 6.17, 6.29$\mu$

EXAMPLE 3

*Preparation of 11α-hydroxy-2α,21-diiodo-4,16-pregnadiene-3,20-dione (V)*

A solution of 1.00 g. of 2α,21-dibromo-11α-hydroxy-4,16-pregnadiene-3,20-dione and 1.00 g. of potassium iodide in 50 ml. of ethyl methyl ketone is allowed to reflux during six hours. The cooled mixture is distributed between 100 ml. of water and 100 ml. of methylene chloride. The organic solution is taken to dryness to give 11α-hydroxy-2α,21-diiodo-4,16-pregnadiene-3,20-dione.

Ultraviolet spectrum:

$\lambda_{max.}^{MeOH}$ 243 m$\mu$ ($\epsilon$ 22,800)

Infrared spectrum:

$\lambda_{max.}^{KBr}$ 2.96, 5.80, 5.90, 6.18, 6.30$\mu$

EXAMPLE 4

*Preparation of 21-acetoxy-11α-hydroxy-2α-iodo-4,16-pregnadiene-3,20-dione (VII)*

A mixture of 2.20 g. of potassium bicarbonate and 1.3 ml. of glacial acetic acid is well ground with a mortar and pestle. The resulting powder is added to a solution of 0.800 g. of 11α-hydroxy-2α,21-diiodo-4,16-pregnadiene-3,20-dione in 65 ml. of acetone, and the mixture is allowed to reflux for sixteen hours. The product is isolated with methylene chloride as described previously.

Ultraviolet spectrum:

$\lambda_{max.}^{MeOH}$ 244 m$\mu$ ($\epsilon$ 23,600)

Infrared spectrum:

$\lambda_{max.}^{KBr}$ 2.96, 5.75, 5.85, 5.91, 6.16, 6.28$\mu$

EXAMPLE 5

*Preparation of 21-acetoxy-11α-hydroxy-4,16-pregnadiene-3,20-dione (VI)*

(A) A solution of 0.398 g. of 21-acetoxy-2α-bromo-11α-hydroxy-4,16-pregnadiene-3,20-dione in 25 ml. of acetone is flushed with carbon dioxide and kept under a carbon dioxide atmosphere. The solution is treated with 20 ml. of 0.43 N chromous chloride solution and kept under carbon dioxide for an additional twenty minutes. The green solution is diluted with 50 ml. of water and extracted with methylene chloride (2 x 50 ml.). The combined organic extracts are washed with two 50 ml. portions of water and dried over magnesium sulfate. The solvent is removed under reduced pressure on the steam bath to give 0.295 g. of a hard glass.

Infrared spectrum:

$\lambda_{max.}^{KBr}$ 2.88$\mu$, 5.70$\mu$, 5.99$\mu$, 6.17$\mu$, 6.28$\mu$, 8.10$\mu$, 9.50$\mu$ (B) A solution of 0.500 g. of 21-acetoxy-2α-iodo-11α-hydroxy-4,16-pregnadiene-3,20-dione in 35 ml. of acetone is treated with 30 ml. of 0.4 N chromous chloride solution as described above. This treatment gives 0.312 g. of 21-acetoxy-11α-hydroxy-4,16-pregnadiene-3,20-dione. The infrared spectrum of this material is identical with that of an authentic specimen.

EXAMPLE 6

*Preparation of 21-acetoxy-11α-methanesulfonyloxy-4,16-pregnadiene-3,20-dione (VIII)*

A solution of 0.212 g. of 21-acetoxy-11α-hydroxy-4,16-pregnadiene-3,20-dione and 1.0 ml. of methanesulfonyl chloride in 5 ml. of pyridine is allowed to stand at +5° C. for sixteen hours. The solution is then darker in color and some solid separates from the solution. The mixture is diluted with methylene chloride (50 ml.) and washed with water (50 ml.), 5% hydrochloric acid solution (50 ml.), and finally with water (50 ml.). The organic solution is taken to dryness to 0.230 g. of a gum. The infrared spectrum of this material is identical with that of an authentic specimen.

EXAMPLE 7

*Preparation of 21-acetoxy-11α-p-toluene-sulfonyloxy-4,16-pregnadiene-3,20-dione (IX)*

A solution of 0.327 g. of 21-acetoxy-11α-hydroxy-4,16-pregnadiene-3,20-dione in 5 ml. of pyridine is treated with 0.400 g. of p-toluenesulfonyl chloride. The solution is kept at +5° C. for sixteen hours. The resulting mixture is diluted with 50 ml. of water and 50 ml. of methylene chloride. The organic solution is taken to dryness to give a residue which is crystallized from acetone-petroleum ether to give white crystals, melting point 158°–159°. The infrared spectrum of this material is identical with that of an authentic specimen.

EXAMPLE 8

*Preparation of 21-acetoxy-4,9(11),16-pregnatriene-3,20-dione (X)*

(A) A solution of 0.230 g. of 21-acetoxy-11α-methanesulfonyloxy-4,16-pregnadiene-3,20-dione and 0.250 g. of anhydrous sodium acetate in 5 ml. of acetic acid is allowed to reflux during two hours. The mixture is diluted with water until the total volume is 30 ml. The solution is extracted with methylene chloride (2 x 25 ml.) and the combined extracts are washed with water (25 ml.), saturated sodium bicarbonate solution (25 ml.) and water (3 x 25 ml.). The organic solution is dried over magnesium sulfate and taken to dryness to furnish 0.136 g. of an amber gum. The material is dissolved in the minimum quantity of benzene and chromatographed on silica gel (column size: 9 x 150 mm.). The column is washed with 100 ml. of benzene, and these washings are discarded. The column is then washed with 125 ml. of 25% ether in benzene, and these washings are taken to dryness. The residue is recrystallized from acetone-petroleum ether to give 21-acetoxy-4,9(11),16-pregnatriene-3,20-dione as needles, melting point 125–127°. A mixture with an authentic specimen, melting point 127–129°, melts at 125–127°. The material has $\lambda_{max.}^{MeOH}$ 238 m$\mu$ ($\epsilon$ 25,000) and $\lambda_{max.}^{KBr}$ 5.70$\mu$ 5.94$\mu$, 6.00$\mu$, 6.18$\mu$, 6.26$\mu$ (B) By a procedure similar to that described in part (A) of this example, 21-acetoxy-11α-p-toluenesulfonyloxy-4,16-pregnadiene-3,20-dione (Example 7) is converted to 21-acetoxy-4,9(11),16-pregnatriene-3,20-dione.

We claim:
1. The compound 2α,21-dibromo-11α-hydroxy-4,16-pregnadiene-3,20-dione.
2. The compound 21-acetoxy-2α-bromo-11α-hydroxy-4,16-pregnadiene-3,20-dione.

3. The compound 11α-hydroxy-2α,21-diiodo-4,16-pregnadiene-3,20-dione.

4. The compound 21-acetoxy-11α-hydroxy-2α-iodo-4,16-pregnadiene-3,20-dione.

5. Compounds having the general formula:

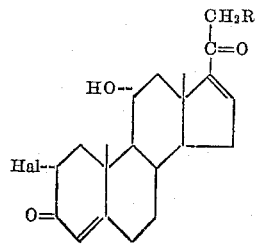

in which R is selected from the group consisting of bromo, iodo and lower alkanoyloxy radicals and Hal is a halogen atom selected from the group consisting of bromine and iodine atoms.

6. Compounds in accordance with claim 5 in which R is a lower alkanoyloxy radical and Hal is a halogen atom selected from the group consisting of bromine and iodine atoms.

References Cited in the file of this patent
UNITED STATES PATENTS

| | | |
|---|---|---|
| 2,862,011 | Hogg et al. | Nov. 25, 1958 |
| 2,864,834 | Mendelsohn et al. | Dec. 16, 1958 |
| 2,874,172 | Herzog | Feb. 17, 1959 |